(12) United States Patent
Shaw et al.

(10) Patent No.: US 7,212,189 B2
(45) Date of Patent: May 1, 2007

(54) CAPACITIVE MOUSE

(75) Inventors: Scott J. Shaw, Fremont, CA (US); Shawn P. Day, San Jose, CA (US); Raymond A. Trent, Jr., San Jose, CA (US); David W. Gillespie, Los Gatos, CA (US); Andrew M. Errington, Milpitas, CA (US)

(73) Assignee: Synaptics Incorporated, San Jose, CA (US)

( * ) Notice: Subject to any disclaimer, the term of this patent is extended or adjusted under 35 U.S.C. 154(b) by 358 days.

(21) Appl. No.: 10/382,799

(22) Filed: Mar. 5, 2003

(65) Prior Publication Data

US 2003/0156098 A1    Aug. 21, 2003

Related U.S. Application Data

(60) Continuation of application No. 09/971,181, filed on Oct. 4, 2001, now abandoned, which is a division of application No. 09/705,593, filed on Nov. 3, 2000, now Pat. No. 6,587,093.

(60) Provisional application No. 60/163,635, filed on Nov. 4, 1999.

(51) Int. Cl.
G09G 5/08        (2006.01)

(52) U.S. Cl. ...................... 345/163; 345/173

(58) Field of Classification Search ............... 345/163, 345/164, 165, 166, 167, 173, 174, 175
See application file for complete search history.

(56) References Cited

U.S. PATENT DOCUMENTS

| 3,541,541 A | 11/1970 | Engelbart | 340/324 |
|---|---|---|---|
| 4,221,975 A | 9/1980 | Ledniczki et al. | 307/116 |
| 4,364,035 A | 12/1982 | Kirsch | 340/710 |
| 4,367,385 A | 1/1983 | Frame | 200/159 B |
| 4,464,652 A | 8/1984 | Lapson et al. | 340/710 |
| 4,873,400 A * | 10/1989 | Rapp et al. | 178/18.05 |
| 5,122,785 A | 6/1992 | Cooper | 340/710 |
| 5,288,993 A | 2/1994 | Bidiville et al. | 250/221 |

(Continued)

FOREIGN PATENT DOCUMENTS

EP    0 880 091 A2    11/1998

OTHER PUBLICATIONS

K. Hinckley et al., "Touch-Sensing Input Devices", *ACM CHI'99 Conference on Human Factors in Computing Systems*, pp. 223-230, May 1999.

(Continued)

*Primary Examiner*—Richard Hjerpe
*Assistant Examiner*—Jean Lesperance
(74) *Attorney, Agent, or Firm*—Ingrassia, Fisher & Lorenz, P.C.

(57) ABSTRACT

A pointing device some or all of whose elements are made from capacitive sensors. Such elements may include a rotary motion detector which includes a rotating member and a plurality of fixed capacitive detecting members; a rolling ball with patterned conductive surface and a plurality of fixed capacitive detecting members; capacitive touch sensors or capacitive switches to serve as mouse buttons; and a scrolling wheel, knob, or touch surface built from capacitive sensors. The pointing device further includes a capacitance measuring circuit and processor to measure variations of capacitance on the various capacitive elements and to determine the movement of and other activations of the mouse.

14 Claims, 16 Drawing Sheets

U.S. PATENT DOCUMENTS

| | | | | |
|---|---|---|---|---|
| 5,305,017 | A | 4/1994 | Gerpheide | 345/174 |
| 5,313,229 | A | 5/1994 | Gilligan et al. | 345/157 |
| 5,530,455 | A | 6/1996 | Gillick et al. | 345/163 |
| 5,644,127 | A | 7/1997 | Ohmae | 250/231.16 |
| 5,805,144 | A | 9/1998 | Scholder et al. | 345/163 |
| 5,867,111 | A | 2/1999 | Caldwell et al. | 341/33 |
| 5,880,411 | A | 3/1999 | Gillespie et al. | 178/18.01 |
| 5,883,619 | A | 3/1999 | Ho et al. | 345/163 |
| 5,907,152 | A | 5/1999 | Dändliker et al. | 250/221 |
| 5,943,052 | A | 8/1999 | Allen et al. | 345/341 |
| 5,963,197 | A | 10/1999 | Bacon et al. | 345/163 |
| 5,982,302 | A * | 11/1999 | Ure | 341/22 |
| 6,211,878 | B1 | 4/2001 | Cheng et al. | 345/357 |
| 6,219,037 | B1 | 4/2001 | Lee | 345/167 |
| 6,223,846 | B1 * | 5/2001 | Schechter | 180/165 |
| 6,396,477 | B1 * | 5/2002 | Hinckley et al. | 345/163 |
| 6,424,355 | B2 * | 7/2002 | Watanabe et al. | 345/668 |

OTHER PUBLICATIONS

Author: Unknown, "Mouse can scroll documents in multiple directions", Fujitsu Takamisawa America, Inc. press release, *Comdex Daily*, Nov. 19/20, 1998.

Author: Unknown, "ScrollPad Mouse Offers Multi-Directional Movement", [Internet] http://fujitsu.takamisawa.com/americas/inut/scrollpad_mouse.html., Fujitsu Takamisawa America, Inc., 1 page, printed Nov. 20, 1998.

Author Unknown: "Multitalented mouse", in tech toys, *EDN*, 1 page, Dec. 3, 1998.

P. Robinson, "Internet Mice" in PCs Without Pain, *San Jose Mercury News*, 1 page, Dec. 27, 1998.

Author: Unknown, "Mighty Mouse" in What's New section of *Popular Science*, p. 26, Apr. 1999.

Author: Unknown, "Mice evolve toward the Internet era", *Computer Products*, pp. 72-77, 90-93, Jun. 1999.

G. Prophet, "Mouse meets touchpad", *EDN EUROPE*, p. 13, Nov. 1999.

K. Hinckley et al., "Touch-Sensing Input Devices", *Proceedings of ACM CHI 99 Conference on Human Factors in Computing Systems*, pp. 223-230, May 1999.

Author Unknown: "Pointing Device-ScrollPad Mouse-FID-677", *Fujitsu Takamisawa Component Catalog*, 3 pages, date unknown.

* cited by examiner

CAPACITIVE MOUSE

CROSS-REFERENCE TO RELATED APPLICATIONS

This application is a continuation of U.S. patent application Ser. No. 09/971,181, filed Oct. 4, 2001 now abandoned, which is a divisional of U.S. patent application Ser. No. 09/705,593, filed Nov. 3, 2000 now U.S. Pat. No. 6,587,093, which claims priority to U.S. Provisional Application Ser. No. 60/163,635, filed Nov. 4, 1999.

BACKGROUND OF THE INVENTION

This patent discloses a computer mouse implemented partially or wholly using capacitive sensors. Pointing devices are an essential component of modern computers. One common type of pointing device is the mouse. Computer mice have been well known for many years. U.S. Pat. No. 3,541,541 Engelbart discloses an early mouse implementation using either potentiometers or wheels with conductive patterns to measure the motion. The conductive patterns on these wheels are measured by direct electrical contact. Direct electrical contact to moving objects has many well-known disadvantages, such as increased friction, and wear and corrosion of contacts.

Modern mice follow a plan similar to that of U.S. Pat. No. 4,464,652 Lapson et al, with a rolling ball mechanically coupled to optical rotary motion encoders. The mouse also includes one or several buttons that operate mechanical switches inside the mouse. Recent mouse designs also feature a wheel for scrolling; U.S. Pat. No. 5,530,455 Gillick et al discloses a mouse with a scroll wheel mechanically coupled to another optical rotary encoder. Such mechano-opticalmice are widely used and well understood, but they do suffer several drawbacks. First, as moving parts they are susceptible to mechanical failure and may need periodic cleaning. Second, they are exposed to dirt, moisture, and other contaminants and environmental effects. Third, as low-cost mechanical devices they may be less sensitive to fine movements than fully electronic devices. Fourth, electromechanical sensors may be more expensive than purely electronic sensors. And fifth, optical sensors draw a significant amount of power due to their use of light emitting diodes.

Another well-known type of mouse measures motion by direct optical sensing of the surface beneath the mouse. U.S. Pat. No. 4,364,035 to Kirsch discloses an optical mouse that worked with patterned surfaces, and U.S. Pat. No. 5,907,152 to Dandiker et al discloses a more sophisticated example that works with natural surfaces. U.S. Pat. No. 5,288,993 to Bidiville et al discloses a pointing device which includes a rotation ball but measures the rotation of the ball by purely optical means. Optical mice eliminate the difficulties associated with moving parts in the motion sensor, but even they must typically use mechanical mouse buttons and a mechanical scroll wheel.

Many alternatives to scroll wheels have been tried. U.S. Pat. No. 5,883,619 to Ho et al discloses a mouse with a four-way scrolling button. U.S. Pat. No. 5,313,229 to Gilligan et al discloses a mouse with a thumb-activated scrolling knob. U.S. Pat. No. 5,122,785 to Cooper discloses a mouse that is squeezed to initiate scrolling. The Scroll point Mouse from International Business Machines includes an isometric joystick for scrolling, and the ScrollPad Mouse from Fujitsu includes a resistive touch sensor for scrolling. The proliferation of such devices shows both that there is a need for a good scrolling device for use with mice, and that none of the technologies tried so far are completely satisfactory.

Capacitive touch pads are also well known in the art; U.S. Pat. No. 5,880,411 discloses a touch pad sensor and associated features. Touch pads can simulate the motion detector and buttons of a mouse by measuring finger motion and detecting finger tapping gestures. Touch pads can also be used for scrolling, as disclosed in U.S. Pat. No. 5,943,052. Capacitive touch pads are solid state electronic devices that avoid many of the pitfalls of mechanical sensors. However, many users prefer mice over touch pads for reasons of ergonomics or familiarity.

Capacitive touch sensors for use as switches are well known in the art. For example, U.S. Pat. No. 4,367,385 to Frame discloses a membrane pressure switch that uses capacitance to detect activation. U.S. Pat. No. 5,867,111 to Caldwell et al discloses a capacitive switch that directly detects the capacitance of the user. The circuits of the '411 patent already cited could also be used to implement a capacitive switch. Applications of capacitive switches to mice are relatively rare, but in the paper "Touch-Sensing Input Devices" (ACM CHI '99, pp. 223–230), Hinckley and Sinclair disclose an experimental mouse with capacitive touch sensors to detect the presence of the user's hand on or near various mouse controls.

U.S. Pat. No. 5,805,144 to Scholder et al discloses a mouse with a touch pad sensor embedded in it. However, Scholder only considers resistive and thermal touch sensors, which are less sensitive and less able to be mounted within the plastic enclosure of the mouse than capacitive sensors. Scholder suggests using the touch sensor in lieu of mouse buttons, but does not consider the use of the touch sensor for scrolling.

The purpose of the present invention is to create a device with the familiar form and function of a mouse, wherein some or all of the mechanical functions of the mouse have been replaced by capacitive sensors.

SUMMARY

The present invention is directed toward a pointing device similar to a conventional mouse, but some or all of whose elements are made from capacitive sensors. Such elements may include a rotary motion detector which includes a rotating member and a plurality of fixed capacitive detecting members; a rolling ball with patterned conductive surface and a plurality of fixed capacitive detecting members; capacitive touch sensors or capacitive switches to serve as mouse buttons; and a scrolling wheel, knob, or touch surface built from capacitive sensors. The pointing device further includes a capacitance measuring circuit and processor to measure variations of capacitance on the various capacitive elements and to determine the movement of and other activations of the mouse.

The disclosed device is directed towards a computer mouse. The computer mouse comprises a touch sensor embedded within a surface material of the mouse. The touch sensor is configured to measure motion of a finger along an axis. The touch sensor is configured to operate by capacitive means.

Another embodiment disclosed includes a pointing device. The pointing device comprises a computer mouse configured to generate cursor commands. A touch sensor is coupled to the computer mouse. The touch sensor is configured for measuring motion of a finger along an axis. The touch sensor is configured for operating by capacitive means. A processor is in operative communication with the touch sensor. The processor is configured to generate a scrolling command in response to the motion of the finger along the axis. The processor is configured to continue generating the scrolling command responsive to the finger lifting from the touch sensor.

Another embodiment disclosed includes a touch input system. The touch input system comprises a capacitive touch sensor configured for measuring motion of a finger along an axis. A processor is in operative communication with the capacitive touch sensor. The processor is configured to generate quadrature signals compatible with those from an optical rotary motion encoder in response to the motion of the finger along the axis.

Yet another embodiment disclosed includes a one-axis touch sensor configured for sensing an object along a single axis. The one-axis touch sensor is configured to generate a scrolling signal responsive to sensing motion of the object touching the one-axis touch sensor.

Still another embodiment disclosed includes a one-axis touch sensor comprising a sensor configured to sense along a single axis. The sensor is configured to generate a quadrature signal responsive to an object touching the sensor. The quadrature signal including characteristics of signals being of the type produced by a rotary encoder.

Still another embodiment disclosed includes a one-axis touch sensor comprising a sensor configured to sense a finger along a single axis of the one-axis touch sensor. A processor is in operative communication with the sensor. The sensor is configured to transmit to the processor one of a touch signal responsive to motion of the finger touching the sensor, and a lift signal responsive to lift off of the finger from the sensor. The processor is configured to generate a scrolling signal responsive to the touch signal and the lift signal.

BRIEF DESCRIPTION OF THE DRAWING FIGURES

DETAILED DESCRIPTION

The following description of preferred embodiments of the disclosure is not intended to limit the scope of the invention to these preferred embodiments, but rather to enable any person skilled in the art to make and use the invention.

Figure 1A:
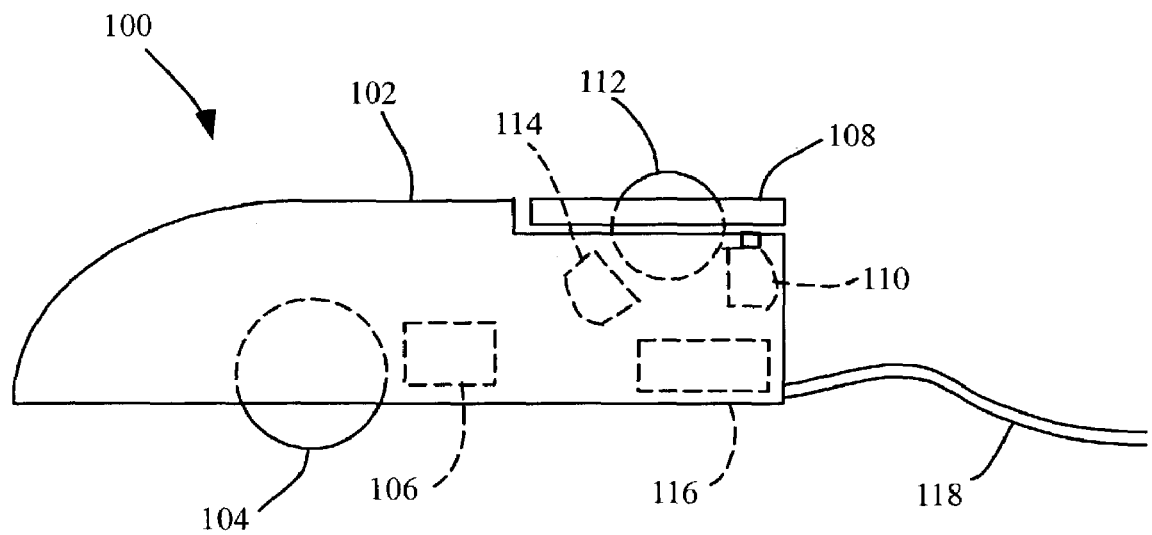
FIG. 1A is a side plan view of a mouse typical of the prior art.
Figure 1B:
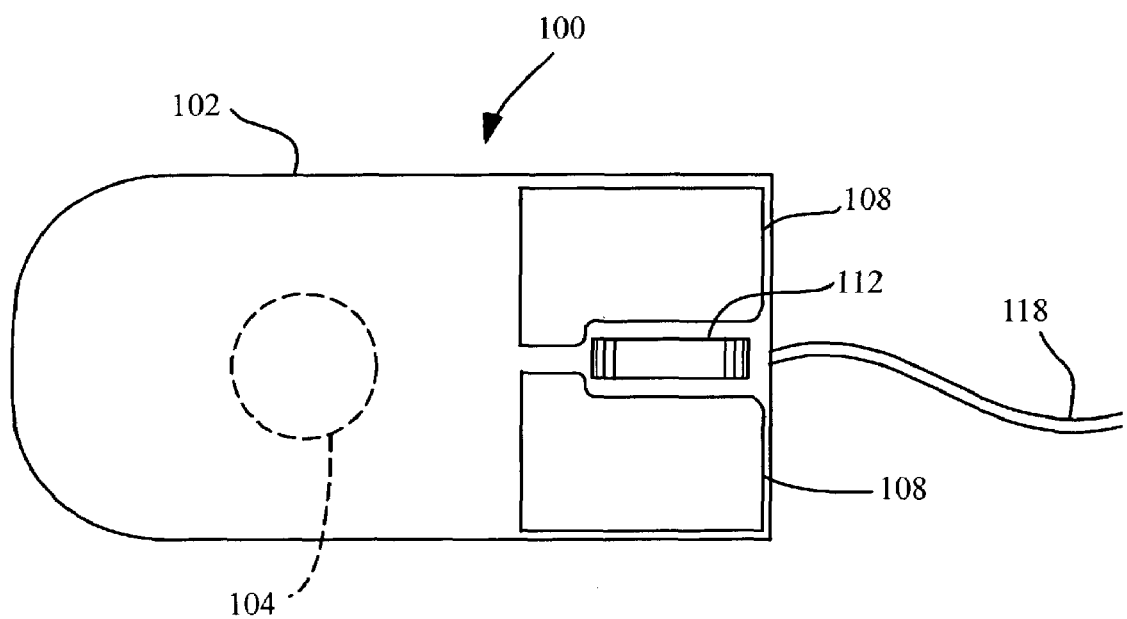
FIG. 1B is a top plan view of a mouse typical of the prior art.

For reference, FIG. 1A shows the elements of a conventional prior art mouse 100 in side view. Enclosure 102, typically of hard plastic, forms the body of the mouse. Ball 104 protrudes from the bottom of enclosure 102 through a small hole. Motion of the mouse over a flat surface causes ball 104 to rotate; this rotation is measured by rotary encoders 106. Typically two rotary encoders are used to measure motion of the mouse in two orthogonal axes. Buttons 108 form part of the top surface of enclosure 102. Finger pressure on buttons 108 is detected by switches 110 mounted below the buttons. Scroll wheel 112 is mounted between buttons 108; its rotation is measured by rotary encoder 114. Inputs from rotary encoders 106 and 114 and switches 110 are combined by processor 116 and transmitted to a host computer via cable 118. FIG. 1B shows the same mouse 100 in top view, featuring enclosure 102, ball 104, buttons 108, scroll wheel 112, and cable 118.

Figure 2A:
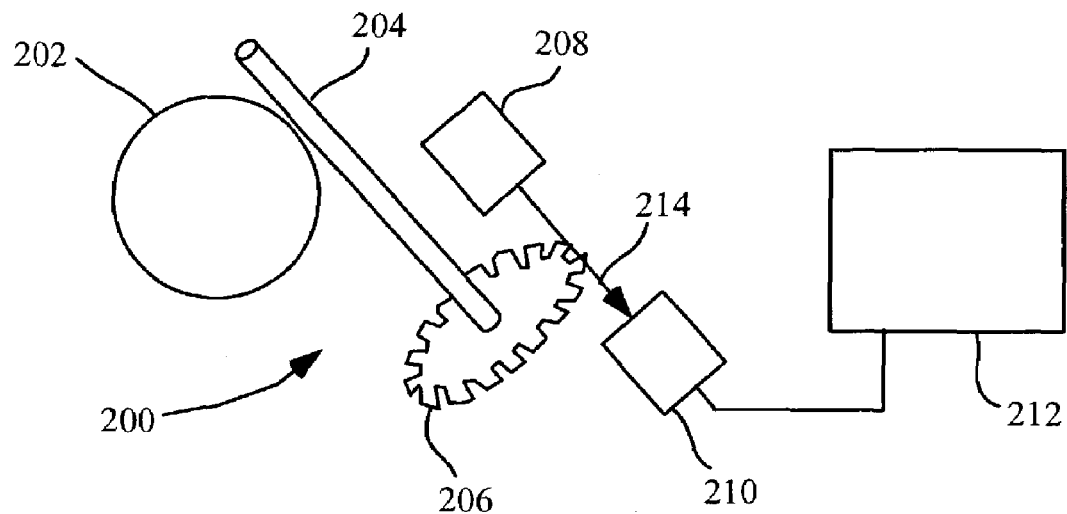
FIG. 2A is a schematic view of a typical prior art rotary encoder.

FIG. 2A shows a typical prior art rotary encoder 200. Rotation of ball 202 causes shaft 204 to spin, thus rotating notched disc 206. Light emitter 208 passes light beam 214 through the notches of disc 206 to light detector 210. As disc 214 spins, the pattern of signals from detector 210 allows processor 212 to deduce the direction and speed of rotation. Note that shaft 204 is excited only by rotation of ball 202 about an axis parallel to shaft 204. By mounting a second rotary decoder (not shown) perpendicular to rotary decoder 200, rotation of ball 202 about two axes, and hence motion of the mouse in a two-dimensional plane, can be detected.

Figure 2B:
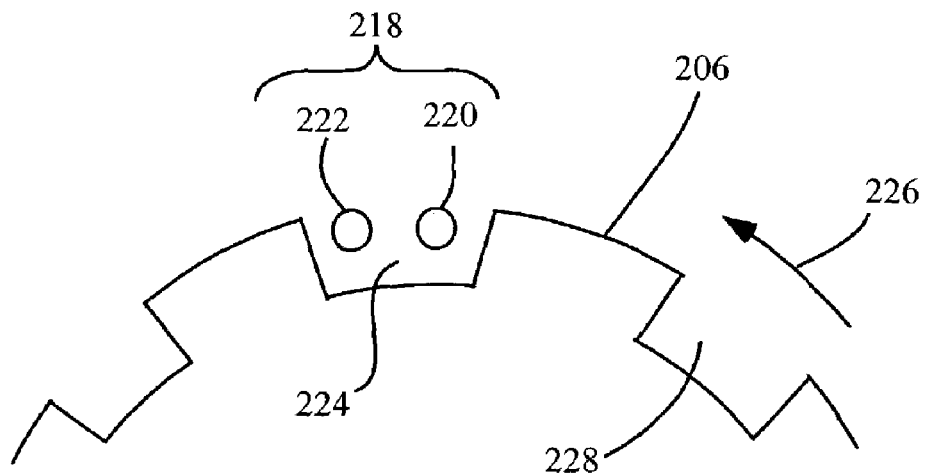
FIG. 2B is a partial side plan view of a rotary disk and light detector employed by mice of the prior art.

FIG. 2B shows a detail view of notched disc 206 and light detector 210. Detector 210 actually contains two light sensitive elements 220 and 222 spaced closely together relative to the spacing of notches 224. As disc 206 rotates in the direction indicated by arrow 226, light sensitive elements 220 and 222 are first both exposed to light through notch 224, then element 220 is eclipsed by the body of disc 206, then element 222 is also eclipsed, then element 220 is exposed to light through adjacent notch 228, then element 222 is also exposed to light through notch 228. Sensors 220 and 222 thus generate the digital quadrature waveform shown in FIG. 2C over time. If disc 206 rotates in the direction opposite arrow 226, the sensors are eclipsed in the opposite order and they generate the digital waveform shown in FIG. 2D. By digitally reading the outputs of light sensors 220 and 222 and decoding the quadrature signals therein, the processor can determine the direction and amount of motion of disc 206.

In an alternate embodiment, light sensitive elements 220 and 222 can be separated and placed at analogous positions within two distinct notch positions of disc 206. This embodiment is preferable if the light sensors 220 and 222 are too large to be placed closely together; the disadvantage is that it is more difficult to align sensors 220 and 222 precisely relative to one another.

Figure 3A:
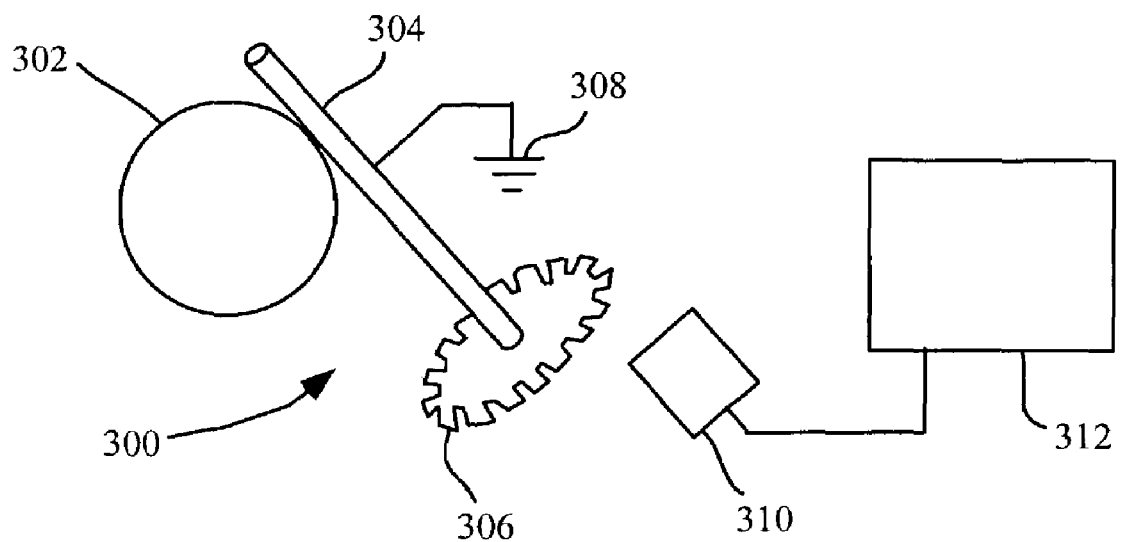
FIG. 3A is a schematic view of a rotary encoder that operates on capacitive principles rather than that which operates on optical principles as depicted in FIG. 2A.

FIG. 3A shows a rotary encoder 300 that operates on capacitive instead of optical principles. Ball 302 spins shaft 304 and notched disc 306. Shaft 304 and disc 306 are made of a conductive material such as metal, and the assembly consisting of shaft 304 and disc 306 is electrically grounded by grounding element 308. Capacitance detector 310 measures the capacitive effects of grounded disc 306. Various methods for grounding a spinning object, such as metal brushings, are known in the art. Alternatively, only disc 306 can be made conductive, with ground 308 applied directly to disc 306. In yet another alternative embodiment, disc 306 is capacitively coupled to a nearby grounded object. In yet another embodiment, a transcapacitance measurement may be done between the body of disc 306 and detector 310, possibly by driving a time-varying signal into disc 306 and measuring the amplitude of coupling of that signal onto detector 310. In any case, capacitance detector 310 measures the position of disc 306 by its capacitive effects, and the resulting signals are read by processor 312.

Figure 3B:
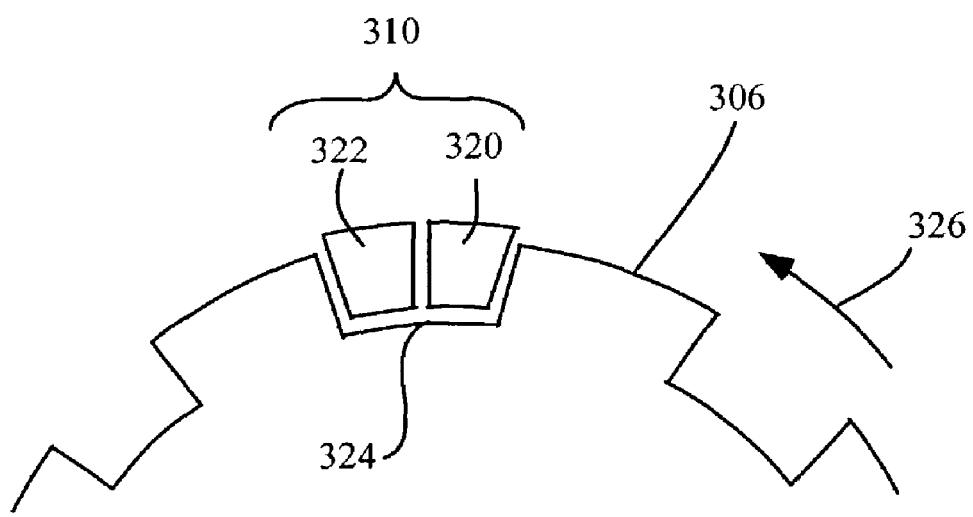
FIG. 3B is a partial side plan view of a notched disk and related capacitance detector.
Figure 3C:
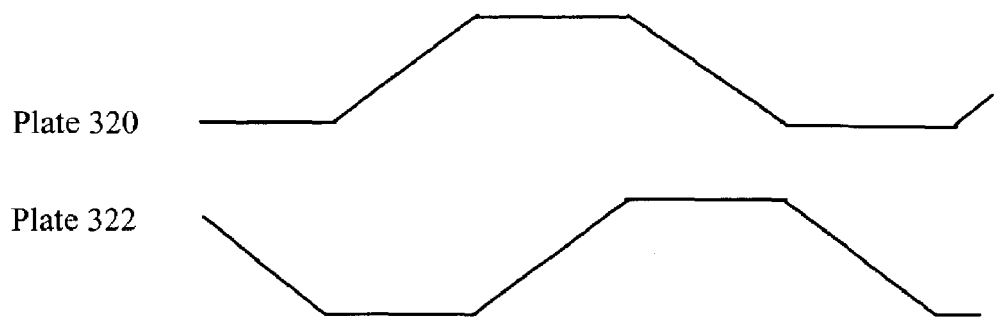
FIG. 3C is a depiction of a waveform as generated by the notched disk and capacitance detector of FIG. 3B.

FIG. 3B shows a detail view of notched disc 306 and capacitance detector 310. As in the case of the optical detector of FIG. 2B, capacitance detector 310 is formed of two conductive plates 320 and 322 placed near but not touching the plane of disc 306. When notch 324 of disc 306 is situated adjacent to plates 320 and 322, those plates each have a low capacitance to ground. As the body of disc 306 moves to be adjacent to plate 320 and then to plate 322, the capacitance to ground of these plates rises to a higher level. Because capacitance is linearly related to the area of overlap of conductive plates, this rise of capacitance of plate 320 is linear. As disc 306 completely covers plate 320 and begins to cover plate 322, the capacitance of plate 320 stays relatively constant while the capacitance of plate 322 linearly rises. As disc 306 continues to rotate in the direction of arrow 326, the capacitance of plate 320 and then plate 322 falls linearly, as depicted in the waveforms of FIG. 3C. If disc 306 rotates in a direction opposite arrow 326, the capacitances of plates 320 and 322 instead generate the waveform of FIG. 3D.

Those experienced in the art will recognize that plates 320 and 322 may be actual metal plates, or they may equivalently be conductive regions formed in a variety of ways, including but not limited to conductive ink painted or screened on a surface or substrate, conductive material such as metal or indium tin oxide plated or otherwise disposed on a surface or substrate, or any other conductive object with at least one substantially flat portion placed in close proximity to disc 306. Similarly, the conductive notched disc 306 may be an actual notched metal disc, or it may be a notched conductive pattern formed on a disc-shaped substrate. The dielectric component of the capacitance between plates 320 and 322 and disc 306 may be an empty gap, a coating, surface, substrate, or other intermediary object, or some combination thereof whose thickness and dielectric constant yield a conveniently measurable capacitance.

Those experienced in the art will further recognize that rotary capacitive sensors are not limited to the disc configuration. Any arrangement in which an irregular conductive object rotates near a conductive sensor will work equally well. In one alternate embodiment, disc 306 is extruded to form a rotating drum with a notched or patterned conductive surface, and plates 320 and 322 are oriented along the long dimension of the drum. The drum embodiment is bulky and mechanically more complex, but allows a larger area of capacitive overlap and hence a stronger capacitance signal. In another alternate embodiment, the notched disc could be simplified to a single "notch," resulting in a semicircular conductive cam facing quarter-circle plates 320 and 322.

Figure 2D:
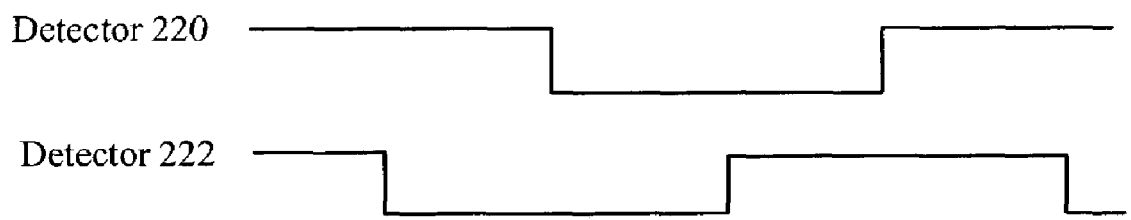
FIG. 2D shows an alternative waveform to that of FIG. 2C.
Figure 3D:
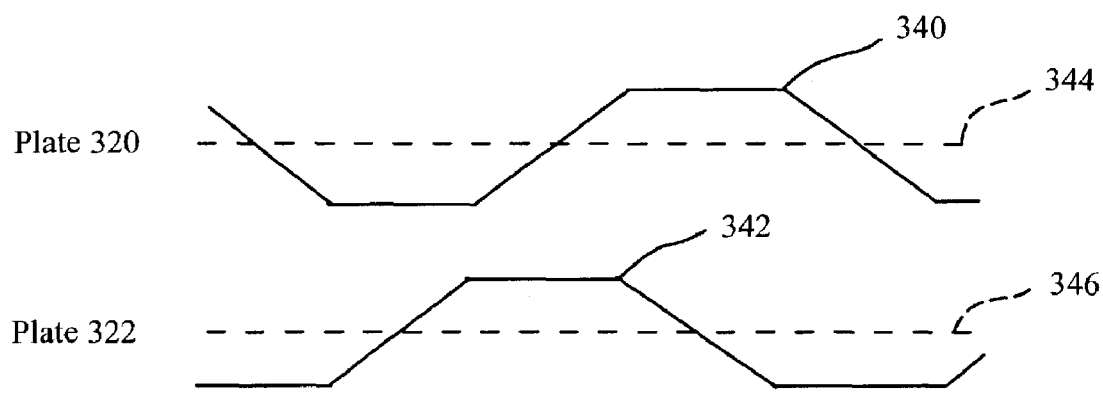
FIGS. 3D and 3E are depictions of waveforms as generated by the notched disk and capacitance detector of FIG. 3B where the capacitance plates rotate in an opposite direction to that of FIG. 3C.
Figure 3E:
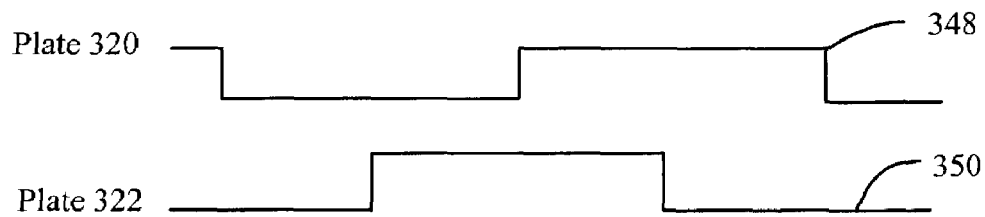

One way to process the capacitance signals from plates 320 and 322 is to compare them against fixed capacitance thresholds. Referring to FIGS. 3D and 3E, comparing capacitance 340 against threshold 344 yields digital waveform 348; similarly, comparing capacitance 342 against threshold 346 yields digital waveform 350. Note that waveforms 348 and 350 of FIG. 3E are identical in nature to the digital waveforms of FIG. 2D. Hence, if threshold comparison is used in this manner to generate digital waveforms, these digital waveforms can be processed by a processor 312 identical to processor 212 of the conventional optical rotary encoder of FIG. 2B.

Capacitance detector 310 can use any of a number of methods for measuring capacitance as are known in the art. U.S. Pat. No. 5,880,411 discloses one such capacitance measuring circuit.

As in the case of the optical encoder of FIG. 2A, note that plates 320 and 322 may be placed adjacent to different notches as long as their positioning within their respective notches is maintained. However, since plates 320 and 322 do not require housings or packages outside the plates themselves, it is convenient to place them side by side mounted on a common substrate in order to ensure that they will remain aligned to each other.

One skilled in the art will observe that by examining the original analog capacitance waveforms of FIGS. 3C and 3D, it is possible to locate disc 306 to a much finer resolution than the notch spacing. This is because at any given point in time, one of the capacitance signals is varying linearly with disc rotation while the other is constant. By tracking these linear variations, processor 312 can track disc rotation at a resolution limited only by the resolution and linearity of the capacitance measurements. In the preferred embodiment, the circuits disclosed in U.S. Pat. No. 5,880,411 are used to perform these precise capacitance measurements.

Because disc rotation can be measured to much higher resolution than the notch spacing, it is possible to use much larger notches on disc 306, and correspondingly larger plates 320 and 322, than are feasible for the analogous notches and sensors of the optical encoder of FIG. 2A. Larger notches and plates allow mechanical tolerances of the assembly to be relaxed, yielding potentially lower costs. Even with larger notches and plates, a capacitive rotary encoder can produce higher-resolution data than an optical rotary encoder if a sufficiently high-resolution capacitance detector is used. Larger plates 320 and 322 also result in a larger capacitance signal which is easier for detector 310 to measure.

The plates 320 and 322 and grounding mechanism 308, being simple formed metal pieces or plated conductive patterns, may also be less costly than the semiconductor light emitters and sensors of FIG. 2A.

Another advantage of the capacitive rotary encoder is that it is not affected by optically opaque foreign matter, such as dirt, which may be picked up and introduced into the assembly by ball 306. The looser mechanical tolerances allowed by the capacitive rotary encoder may also make it more resistant to jamming by foreign matter.

Figure 4:
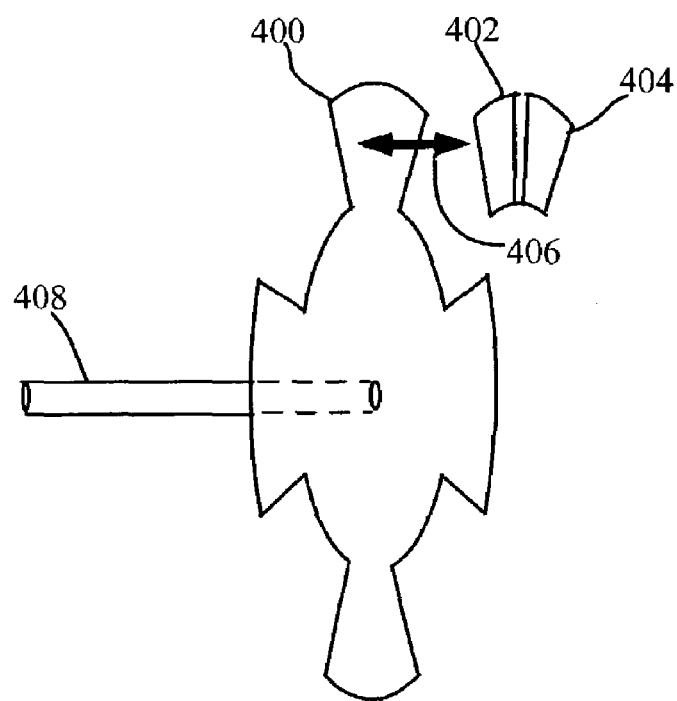
FIG. 4 is a partial schematic side view of a capacitive rotary encoder for use herein.
Figure 5:
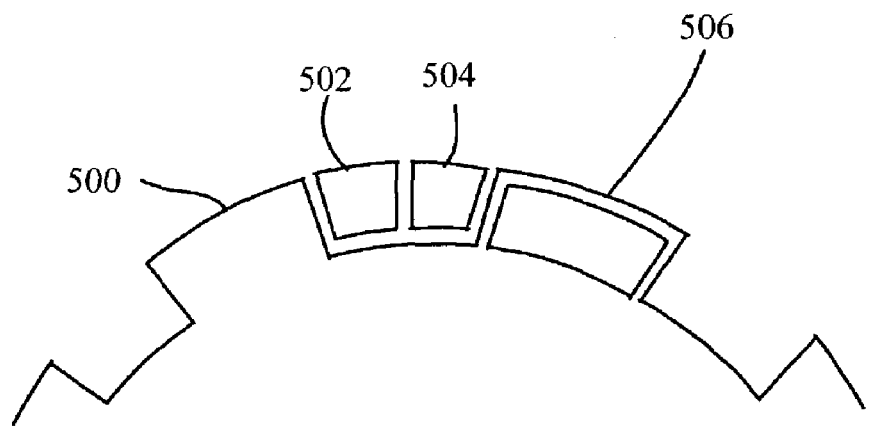
FIG. 5 is a partial side plan view of a rotary encoder as an enhancement of the encoder depicted in FIG. 3A.

FIG. 4 shows a side view of the capacitive rotary encoder, with disc 400 and plates 402 and 404 separate by a gap 406. Gap 406 is drawn large for illustrative purposes, but in the preferred embodiment gap 406 is kept as small as possible to maximize the capacitance between disc 400 and plates 402 and 404. If gap 406 is small, and the tolerances of the encoder assembly are loose as previously disclosed, then movement of disc 400 along the axis of shaft 408 will have a proportionately large effect on the width of gap 406. This variation can impact the accuracy of the capacitance measurements of plates 402 and 404. FIG. 5 shows an enhancement to the arrangement of FIG. 3A that solves this problem.

In FIG. 5, disc 500 is adjacent to three plates 502, 504, and 506. Plates 502 and 504 are identical to plates 320 and 322 of FIG. 3A. Plate 506 is the size of plates 502 and 504 combined, and is located near plates 502 and 504; in FIG. 5, plate 506 occupies the next notch space after plates 502 and 504. In an alternative embodiment, matching could be improved by splitting plate 506 into two half-plates each exactly the size of plates 502 and 504. In the system of FIG. 5, the processor computes the sum of the capacitance measurements from plates 502, 504, and 506. Note that the total overlap area between disc 500 and plates 502, 504, and 506 is constant regardless of the rotary position of disc 500. Hence, the summed capacitance of plates 502, 504, and 506 should be constant. Variation in this sum indicates that disc 500 has shifted relative to plates 502, 504, and 506, for example, by moving along the axis as shown in FIG. 4. The processor divides each plate capacitance measurement by the summed capacitance in order to normalize the capacitance measurements. These normalized measurements are invariant of the width of gap 406 of FIG. 4, and are suitable for use in the position computations previously discussed.

Figure 6:
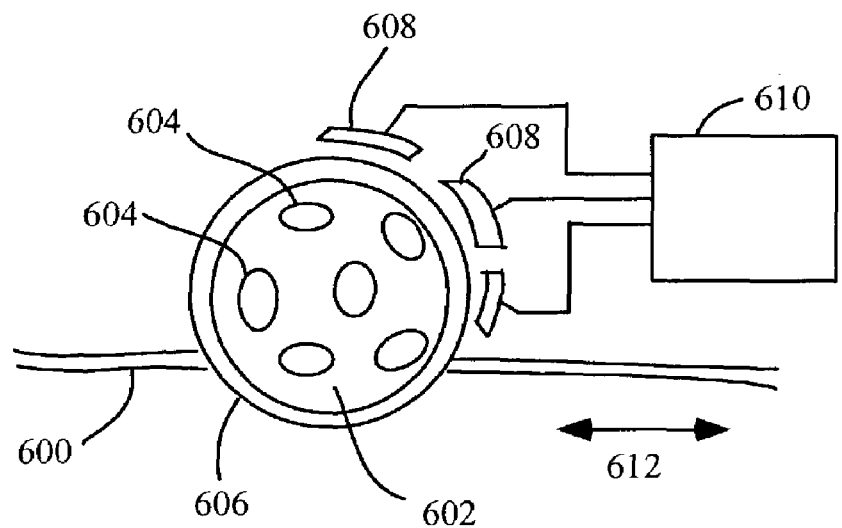
FIG. 6 is a partial schematic side view of a mechanism for capacitively sensing mouse motion.

FIG. 6 shows an alternative mechanism for capacitively sensing mouse motion. This mechanism employs a rolling ball 602 protruding from a hole in enclosure 600 similar to that of a conventional mouse. The surface of ball 602 is patterned with regions 604 of higher and lower conductivity. This patterning can be accomplished by forming the ball of material such as rubber of varying conductivity, or by treating the surface of the ball with conductive substances such as paint or metal. The conductive surface of the ball may be protected if necessary by a dielectric outer layer 606. Capacitance detectors 608 are placed in several locations proximate to ball 602. As the ball rolls, the conductive regions 604 will move from one capacitance detector to another; processor 610 correlates these signals to measure the movement of ball 602. Because the capacitance measurements vary linearly as conductive region 604 moves from one detector 608 to another, processor 610 can interpolate in order to measure movement of the ball to very high resolution.

The system of FIG. 6 requires several sensors 608 in order to ensure that at least one conductive region 604 is detectable at all times. Conductive regions 604 should be as large as possible in order to maximize the capacitive signal, subject to the constraint that different regions 604 should be separated by enough distance to allow individual regions 604 and the spaces between them to be resolved by detectors 608. Hence, the spaces between regions 604 should be at least comparable to the size of detectors 608, and the conductive regions 604 should be at least a significant fraction of the size of detectors 608.

FIG. 6 depicts a linear row of sensors 608 curved around the surface of ball 602. Such an arrangement can detect rolling of the ball in one dimension; the example of FIG. 6 would detect the rolling resulting from motion of the mouse along axis 612. In the preferred embodiment, other sensors (not shown) are arranged in a row perpendicular to the row of sensors 608 in order to measure motion of the mouse in two dimensions.

In one embodiment, the conductive regions in the ball are grounded to facilitate capacitance measurements by simple conductive plates. However, grounding the conductive regions of the ball may be impractical, so in the preferred embodiment, capacitance detectors 608 measure transcapacitance.

Figure 7:
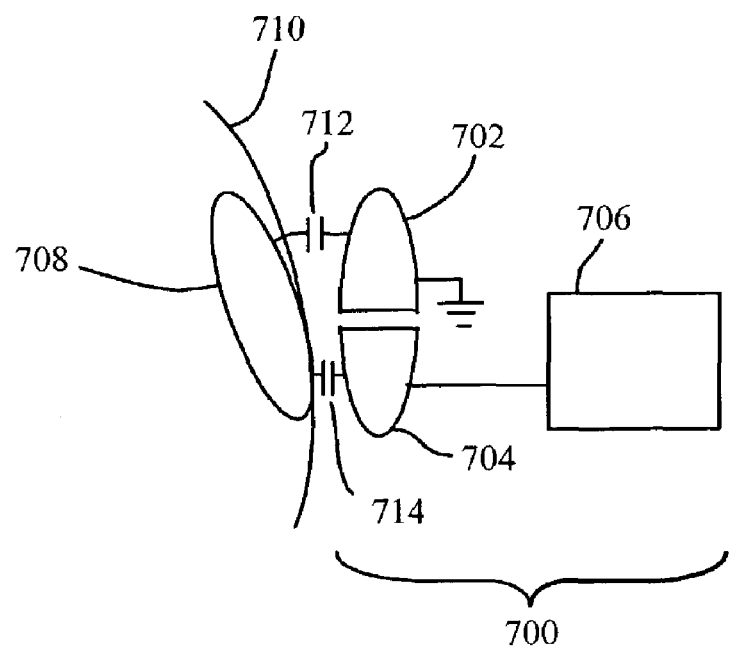
FIG. 7 is a partial schematic side view of a capacitance detector and capacitance measurement circuit for use herein.

FIG. 7 shows one simple way to measure transcapacitance. The capacitance detector 700 consists of two plates 702 and 704. Plate 702 is connected to ground, and plate 704 is connected to a capacitance measurement circuit 706. Proximity to an electrically floating conductor 708 within ball 710 creates a capacitive coupling 712 from plate 702 to conductor 708, and a capacitive coupling 714 from conductor 708 to plate 704, hence effectively coupling plate 702 to plate 704 through two series capacitances. Those experienced in the art will recognize that many other configurations of plates 702 and 704 are possible, such as interdigitated lines or concentric circles and toroidal shapes. In still another embodiment of capacitance detector 700, plate 702 could be driven with a time-varying signal which is capacitively coupled onto plate 704 and detected by circuit 706.

The motion sensor of FIG. 6 requires even fewer moving parts than that of FIG. 3, and thus can lead to an even cheaper and more physically robust mouse. However, the system of FIG. 6 has the disadvantage of requiring more complex processing in processor 610.

Other methods for detecting mouse motion are known in the art, such as the optical methods of U.S. Pat. Nos. 4,546,347 (Kirsch) and 5,907,152 (Dandiker et al.). Fully solid-state optical motion detectors would pair well with the capacitive button and scrolling controls of the present invention to form an entirely solid-state optical/capacitive mouse.

Mice conventionally include one or more buttons as well as a motion detector. Referring back to FIG. 1, button 108 is typically linked to a mechanical switch 110. By pressing down on the surface of switch 108, the user closes switch 110. Mechanical switches have various well known disadvantages. Since they have moving parts, mechanical switches can fail over time or with rough handling. Also, mechanical switches require a certain threshold of pressure for activation, which can tire the user with repeated use.

Figure 8A:
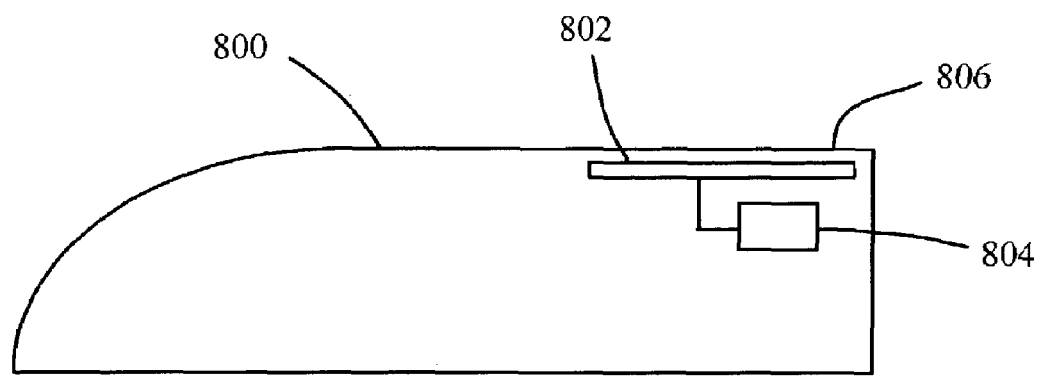
FIGS. 8A and 8B are side views of typical capacitive switches housed within a mouse enclosure.

Mechanical switches can be replaced by capacitive sensors in several ways. FIG. 8A shows one type of capacitive switch that is well-known in the art. Mouse enclosure 800 is shaped similarly to that of a conventional mouse, but with no moving parts in its top surface. Conductive plate 802 is placed on or near the surface of the enclosure, preferably covered by a protective dielectric layer 806. Capacitance measurement circuit 804 monitors the capacitance of plate 802. When a finger (not shown) touches surface region 806, the capacitance to ground of plate 802 increases beyond a threshold set by measurement circuit 804. When no finger is present, the capacitance to ground of plate 802 is below the threshold. By comparing the capacitance of plate 802 to the threshold, circuit 804 can generate a digital signal which is equivalent to the signal produced by a mechanical switch.

The system of FIG. 8A implements a mouse button which requires zero activation force; indeed, depending on the threshold setting, it could even be sensitive to mere proximity of the finger. Although this mouse button solves the problem of tiring the finger during repeated activations, it introduces the converse problem of tiring the finger during periods of inactivity, since the finger must not be rested against surface 806 without accidentally activating the button.

Figure 8B:
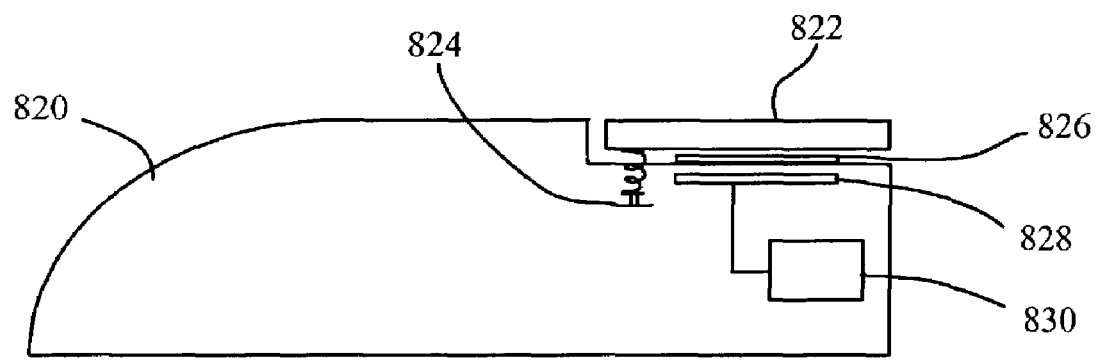

FIG. 8B shows a second type of capacitive switch, also well-known in the art. Enclosure 820 includes a separate movable button portion 822 as in a conventional mouse. Instead of a mechanical switch beneath button 822, there is a conductive plate 826 and some sort of spring mechanism 824. A variety of mechanisms 824 are usable and well-known, including but not limited to metal springs, compressible foam, or single-piece enclosures with buttons made of springy material. Spring mechanism 824 may optionally also include a tactile feedback means to impart the familiar clicking feel to button activations. A second conductive plate 828 is mounted beneath plate 826 SO that pressure on button 822 brings plate 826 measurably closer to plate 828, thus increasing the capacitance between plates 826 and 828. Capacitance measuring circuit 830 detects this change in capacitance to form a button signal.

Because the system of FIG. 8B works by measuring the capacitance between plates 826 and 828, these plates do not need to make electrical contact in order to activate the button. Indeed, these plates must be kept out of electrical contact in order for capacitance measuring circuit 830 to operate properly. Many straightforward ways are known to separate plates 826 and 828, including but not limited to an insulating surface on plate 826, plate 828, or both plates, or an insulating compressible foam placed between the plates.

The system of FIG. 8B is very similar to a conventional mechanical switch, but it is more resistant to dirt and wear because button activation does not require an electrical contact to be made.

Capacitance measuring circuits 804 and 830 may use any of a variety of well-known capacitance measuring techniques. In the preferred embodiment, a circuit like that disclosed in U.S. Pat. No. 5,880,411 is used.

Many mice also include a scrolling mechanism. This mechanism typically employs a rotating wheel, an isometric joystick, or a set of directionally arranged buttons; the scrolling mechanism 112 is typically mounted between two mouse buttons 108 as shown in FIG. 1B.

Figure 9:
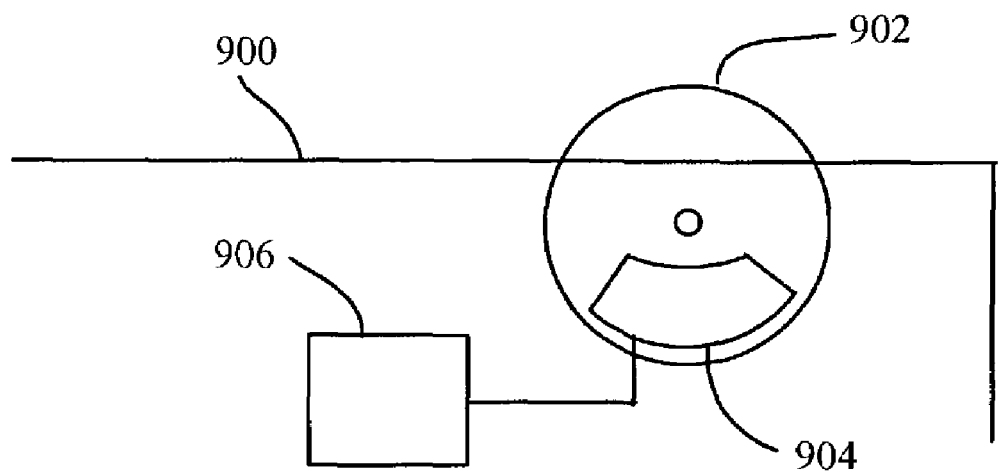
FIG. 9 is a partial schematic side view of a scrolling wheel, capacitive rotary encoder and processor for use herein.

FIG. 9 shows one way to measure a scrolling command capacitively. A scrolling wheel 902 is mounted in mouse enclosure 900, seen in side view. The wheel appears to the user to be the same as the wheel of the conventional mouse of FIG. 1A and 1B. Rotation of the wheel is measured by capacitive rotary encoder 904 and processor 906 similar to those of FIG. 3A and 3B. The capacitive rotary encoder 904 can be mounted directly on the axis of scrolling wheel 902 as shown in FIG. 9, or wheel 902 can be mechanically linked to a separate rotary encoder mechanism elsewhere in enclosure 900.

Figure 10:
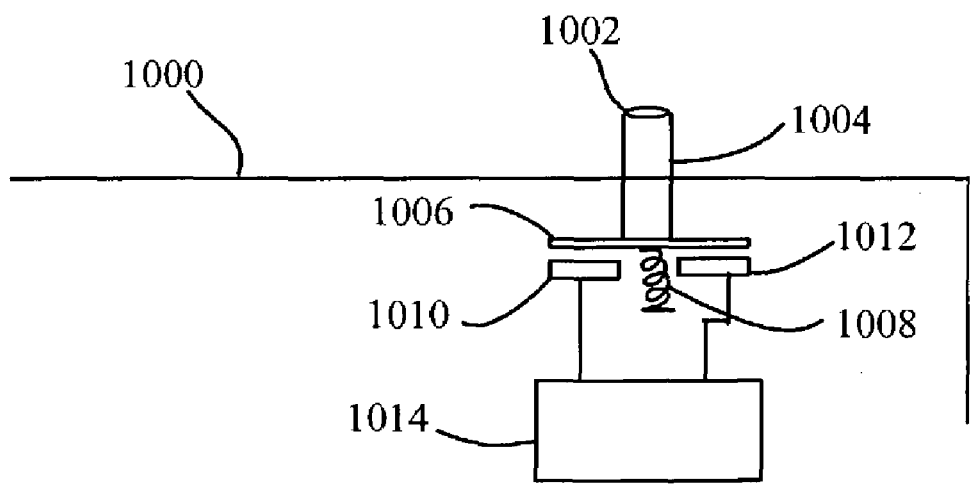
FIG. 10 is a partial schematic view of a further version of a capacitive scrolling control for use in the present invention.

FIG. 10 shows another capacitive scrolling control. A scrolling knob 1002 protrudes from mouse enclosure 1000. Knob 1002 is connected by stick 1004 to conductive plate 1006 and to spring mechanism 1008. Depending on the stiffness of spring 1008, knob 1002 may act as either a rocking control or an isometric joystick. Conductive plates 1010 and 1012 are mounted near plate 1006, and capacitance measuring circuit 1014 measures the capacitances between plate 1010 and plate 1006, and between plate 1012 and plate 1006. When knob 1002 is pressed in a forward or backward direction, plate 1006 is deflected slightly to produce a measurable change in the capacitances of plates 1010 and 1012. By comparing the capacitances of plates 1010 and 1012, circuit 1014 can detect this forward or backward deflection to produce a scrolling command. Also, by noting an increase in capacitance of both plates 1010 and 1012 at once, circuit 1014 can detect downward pressure exerted on knob 1002. Many conventional mice use a downward deflection of the scrolling control as an additional command signal, such as the activation of a third mouse button.

By placing two additional plates along an axis perpendicular to the axis of plates 1010 and 1012, it is possible to measure deflection of knob 1012 in three dimensions. Sideways deflection of knob 1012 can be interpreted as a command for horizontal scrolling, or panning. Forward and backward deflection can be interpreted as vertical scrolling, and downward deflection can be interpreted as an additional mouse button or other special command.

In an alternate embodiment, plates 1010 and 1012 are situated above plate 1006 so that pressure on knob 1002 causes plate 1006 to deflect away from plates 1010 and 1012, and the measured capacitance on plates 1010 and 1012 to decrease with pressure instead of increasing. Those skilled in the art will recognize that the processing necessary for this embodiment is identical to that required for the embodiment of FIG. 10 except for a change of sign.

The systems of FIGS. 9 and 10 share the disadvantage that they are still mechanical devices with moving parts. For greatest robustness and sensitivity and lowest cost, a truly solid state solution to scrolling is preferable.

Figure 11A:
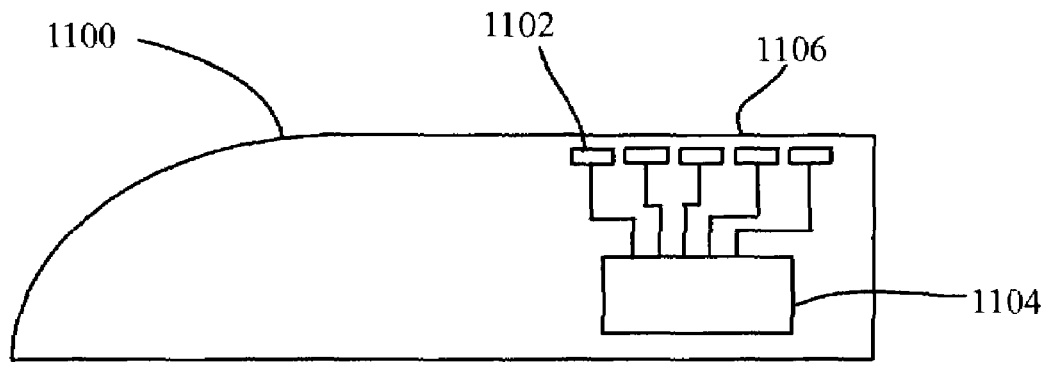
FIGS. 11A through 11D are side and top plan views, respectively, of a mouse enclosure showing plates for capacitive sensing.
Figure 11B:
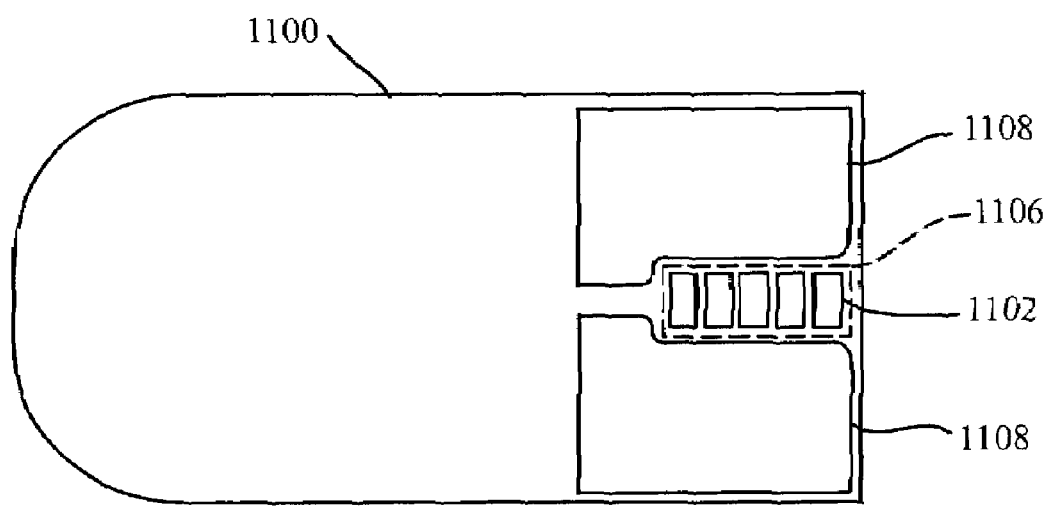
Figure 11C:
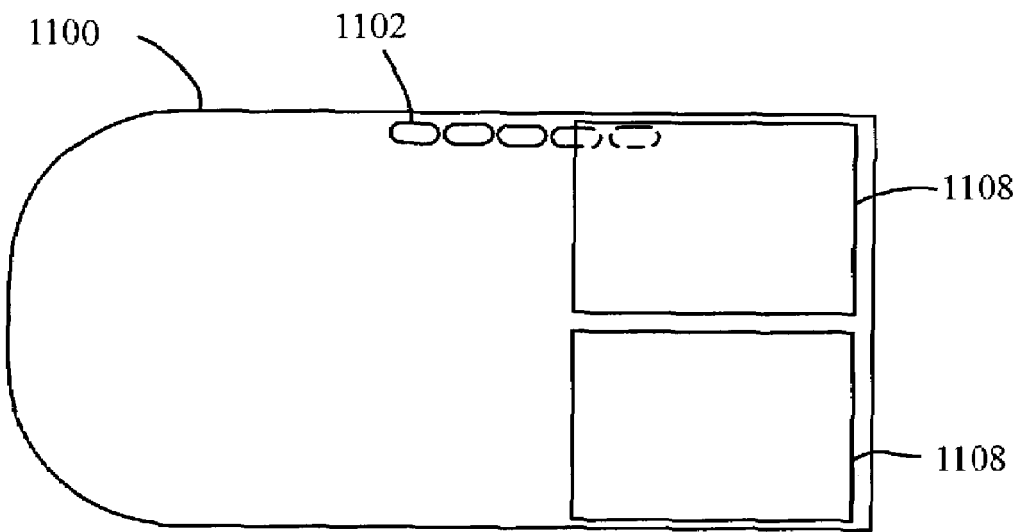

FIG. 11A shows a scrolling control that operates directly on capacitive sensing principles. Mouse enclosure 1100 contains an array of conductive plates 1102 connected to a processor 1104 that includes capacitance measuring circuits. Plates 1102 are insulated from the user's finger by surface 1106. In the preferred embodiment, the array of plates 1102 is placed in between two mouse buttons 1108 as shown in FIG. 11B. Many alternate embodiments in which the scrolling control is placed elsewhere are possible, such as the embodiment of FIG. 11C in which the scrolling control is mounted on the side of mouse enclosure 1100 for access by the user's thumb. The mouse buttons 1108 of FIGS. 11B and 11C could be capacitive buttons as previously disclosed, or conventional mechanical switches or any other suitable type of button.

Figure 11D:
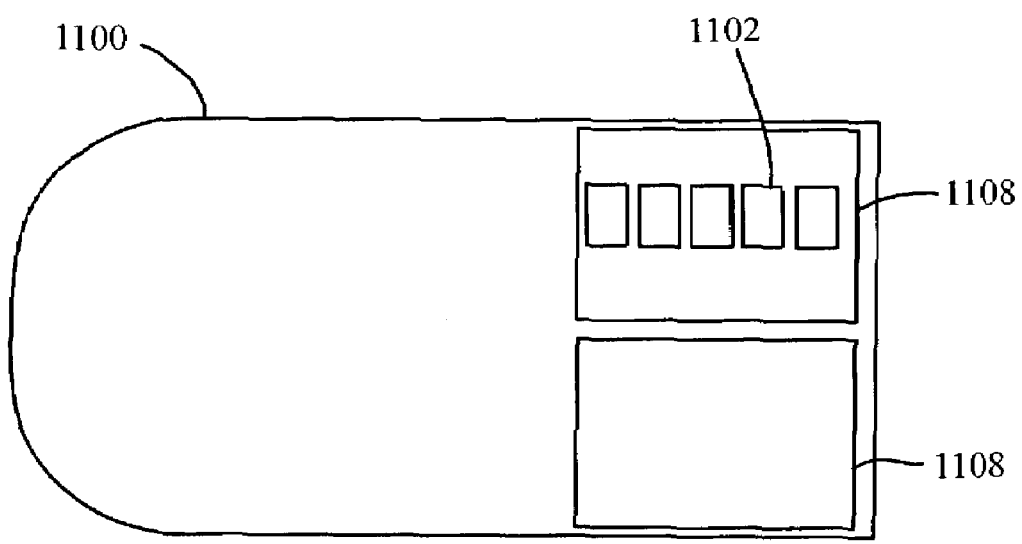

FIG. 11D shows yet another configuration, in which scrolling sensors 1102 are placed on top of a conventional mouse button 1108; pressing down on button 1108 without substantially moving the finger produces a button click, while lightly touching button 1108 and then moving the finger generates scrolling.

Preferably, plates 1102 are numerous and spaced closely together so as to allow interpolation of the finger position to greater resolution than the plate spacing. In one preferred embodiment, nine plates are used spanning a distance of approximately one inch. U.S. Pat. No. 5,880,411 discloses a preferred method for measuring the capacitances of an array of sensors and interpolating the finger position from those measured capacitances. Many other methods are possible and well-known in the art, such as that of U.S. Pat. No. 5,305,017 Gerpheide.

Once the finger position among plates 1102 is known, motion of the finger along the axis of plates 1002 can be measured by comparing finger positions at successive times. Processor 1104 generates a scrolling signal of a certain direction and distance when a finger motion of a corresponding direction and distance is measured. The effect as observed by the user is as if the user were rolling a wheel like wheel 902 of FIG. 9 by moving the finger forward and backward on the top edge of the wheel. Instead, the user moves the finger forward and backward along sensor surface 1106 to produce the identical scrolling signals.

In any scrolling mouse, but particularly in a capacitive scrolling mouse, it may be desirable to provide for different regimes of low-speed and high-speed scrolling in order to account for the fact that the scroll surface 1106 is much shorter than a typical scroll bar in a typical graphical user interface. A simple way to provide for different speed regimes is to use the technique commonly known as "acceleration" or "ballistics" when applied to mouse motion signals. In this technique, very small finger motions translate to disproportionately small scroll signals, and very large finger motions translate to disproportionately large scroll signals.

In the preferred embodiment, processor 1104 measures the total amount of finger signal as well as the finger position, and generates a scrolling signal only when sufficient finger signal is present. Otherwise, the scrolling signal when no finger was present would be ill-defined, and the mouse would be prone to undesirable accidental scrolling. In the preferred embodiment, processor 1104 compares the total summed capacitance on all sensors 1102 against a threshold to determine finger presence or absence; in an alternate embodiment, processor 1104 instead compares the largest capacitance signal among all sensors 1102 against a threshold. The threshold should be set high enough so that only deliberate finger actions result in scrolling. If the threshold is set too low, the mouse may scroll in response to mere proximity of the finger, in general an undesirable feature.

There are many ways to mount sensors 1102 under surface 1106. Some of these ways are depicted in FIGS. 12A through 12E. Those experienced in the art will realize that many other mounting schemes are possible, and that the particular choice of mounting scheme does not alter the essence or the basic operation of the invention.

Figure 12A:
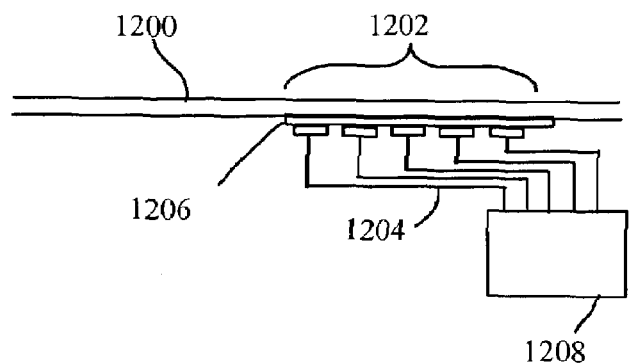
FIGS. 12A through 12E are side views of sensors mounted for use herein.

In FIG. 12A, scrolling surface 1202 is an uninterrupted region of enclosure 1200. Sensors 1204 are affixed to the back surface of enclosure 1200 using adhesive or other intermediary substance 1206. Adhesive 1206 could be eliminated by the use of a self-adhesive sensor material 1204 such as conductive paint. Wires or other conductors connect sensors 1204 to processor 1208.

Figure 12B:
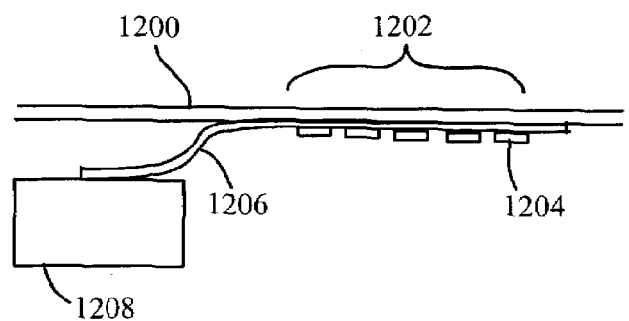

In FIG. 12B, sensors 1204 are disposed on a substrate material 1206 which is then affixed to the back surface of enclosure 1200. Sensors 1204 might be composed of conductive ink, indium tin oxide, metal foil, or any other conductive material. Substrate 1206 might be polyester film, plastic, glass, or any other material on which conductive sensors can be disposed. In the example of FIG. 12B, substrate 1206 bends away from enclosure 1200 to carry the conductive signals from sensors 1204 to processor 1208.

Figure 12C:
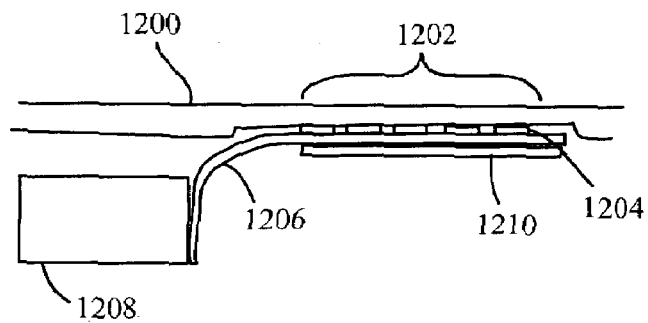

In FIG. 12C, the material of enclosure 1200 in or near scrolling region 1202 has been made thinner than normal in order to increase the capacitive coupling from sensors 1204 to the finger. Additionally, sensors 1204 have been disposed on the opposite side of substrate 1206 in order to increase their proximity to the finger. To strengthen the enclosure, solid backing 1210 can optionally be placed behind the sensors. Layer 1210 may also be made conductive and electrically grounded in order to isolate sensors 1204 from interference from other circuits within the mouse. A similar grounded shield may be used in any of the other sensor arrangements disclosed herein.

Figure 12D:
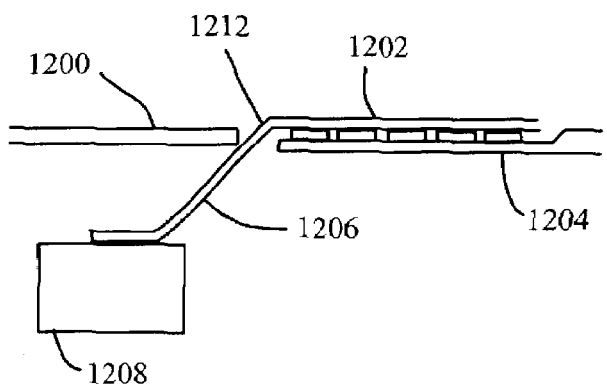

In FIG. 12D, substrate material 1206 leads out through hole 1212 to the surface of enclosure 1200. In this example, substrate 1206 itself forms the protective dielectric layer 1202 between sensors 1204 and the finger. Hole 1212 may be protected and disguised in various ways, such as by combining hole 1212 with the opening around the edge of a mechanical mouse button.

Figure 12E:
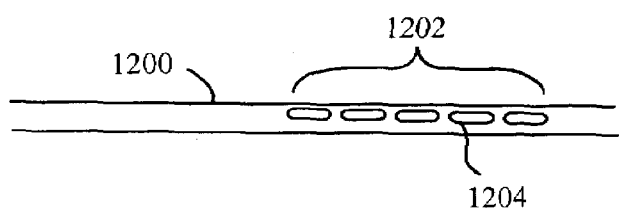

In FIG. 12E, sensors 1204 are embedded directly into the material of enclosure 1200, for example in the form of wires or foil strips encased in plastic.

When sensors 1204 are disposed on a substrate 1206, it is convenient to use an extension of substrate 1206 to carry the sensor signals to processor 1208, as shown in FIGS. 12B, 12C, and 12D. In these cases, sensors 1204 and their associated wiring may be patterned on substrate 1206 using conductive ink or other suitable material. FIGS. 13A to 13D show several of the many possible patterns.

Figure 13A:
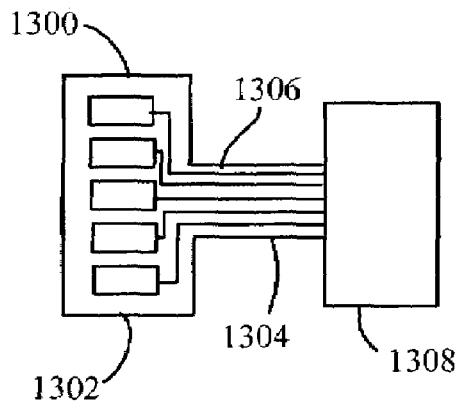
FIGS. 13A through 13D are schematic views of alternative patterns for sensors for use herein.

In FIG. 13A, substrate 1300 extends beyond the area of sensors 1302 on one side. This side extension 1306 forms a carrier for the sensor signals 1304 to a processor 1308. Processor 1308 may be mounted to the side of sensor area 1302 as shown, or it may be mounted beneath sensor 1302 or in another location, with extension 1306 bending, folding, or warping as it leads away from sensor 1302.

Figure 13B:
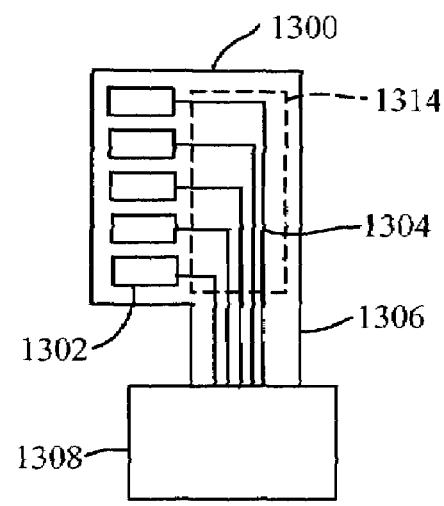

In FIG. 13B, signals 1304 bend at 90 degrees and extension 1306 leads away along the length of the area of sensors 1302.

Figure 13C:
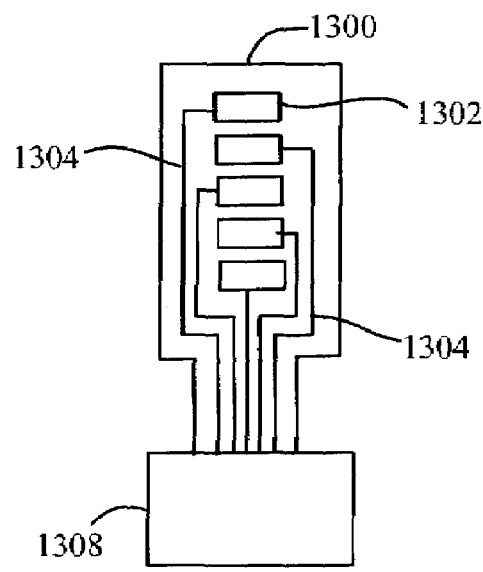

FIG. 13C is similar to FIG. 13B, but sensors 1304 leave the area of sensors 1302 on both sides in order to balance the extension of substrate 1300 to the sides of the area of sensors 1302.

Figure 13D:
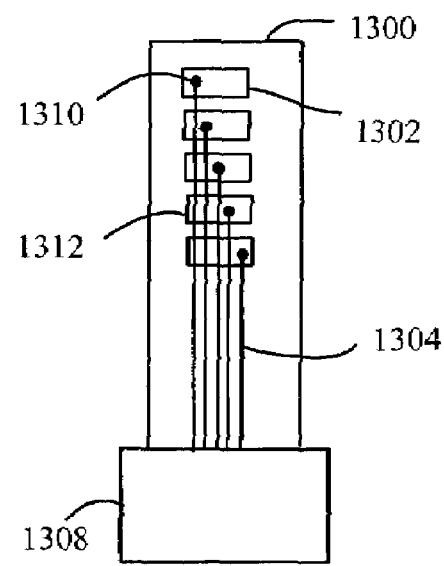

In FIG. 13D, two layers of conductive material are used with an insulating layer or substrate between. The conductive first layer contains sensors 1302. The second conductive layer contains sensor signals 1304 running in a direction perpendicular to sensors 1302. Vias 1310 penetrate the insulating layer to connect sensors 1302 to signal wires 1304. In crossings 1312 of wires 1304 over sensors 1302 without vias, the two conductive layers are electrically isolated although there will be some capacitive coupling that processor 1308 must take into account. The sensor of FIG. 13D will be more expensive due to its use of additional layers, but it avoids any extension of substrate 1300 around the area of sensors 1302. Such extension may be undesirable for design or aesthetic reasons, in addition to providing opportunities for undesirable capacitive coupling between the finger and wires 1304 when the finger touches near but not directly in the area of sensors 1302. The latter undesirable capacitive coupling can also be remedied by the addition of a grounded shield over the exposed wires 1304, as shown by region 1314 of FIG. 13B.

Figure 14:
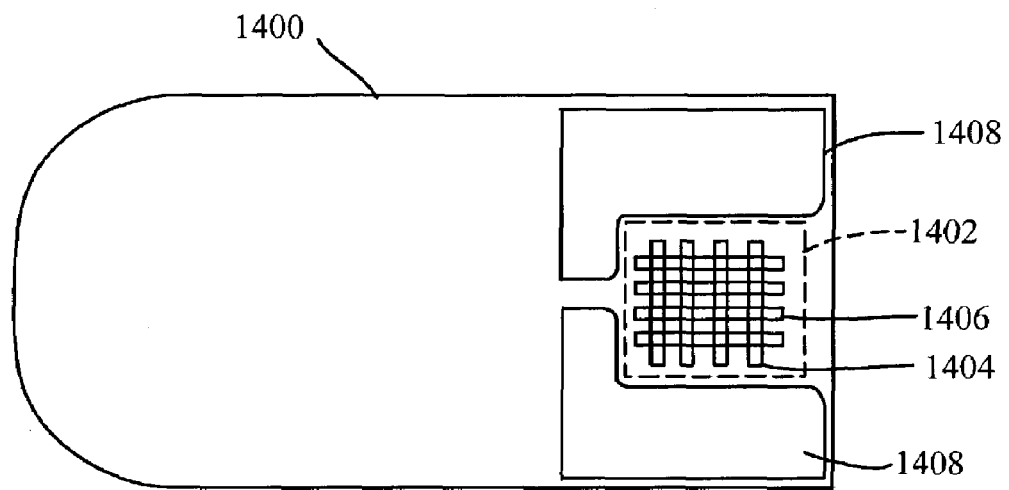
FIG. 14 is a top plan view of a mouse enclosure and scrolling area for use in creating the present capacitive mouse.

Yet another embodiment of the capacitive scrolling control is shown in FIG. 14. Mouse enclosure 1400 includes a two-dimensional scrolling area 1402 preferably disposed between mouse buttons 1408. Scrolling area 1402 includes an array of sensors 1404 disposed in one direction, and a second overlapping array of sensors 1406 disposed in a substantially perpendicular direction to form a two-dimensional matrix. Each array of sensors is processed using methods analogous to FIGS. 11 through 13; the position results from the two arrays are combined to form the complete finger location in two dimensions.

Two-dimensional capacitive touch sensors, or touch pads, are well known in the art. In the preferred embodiment, the methods of U.S. Pat. No. 5,880, 411 are used. FIG. 2 of the '411 patent illustrates a diamond pattern for sensor matrix 1402 which is preferred due to various advantages disclosed in that patent. Many other sensing techniques and sensor geometries are known in the art.

Once the finger position in two dimensions is known, finger motion in the horizontal and vertical directions can be measured by comparing finger positions at successive times. Horizontal finger motion translates to horizontal scrolling, or panning. Vertical finger motion translates to vertical scrolling. In one embodiment, diagonal finger motion translates to simultaneous horizontal and vertical scrolling. In an alternate embodiment, the horizontal and vertical motion signals are compared to discover whether the finger motion is primarily horizontal or primarily vertical, and the corresponding type of scrolling is applied.

Scrolling wheel mice like that of U.S. Pat. No. 5,530,455 typically contain an additional switch to sense when the wheel is pressed down by the user. This switch generates a signal similar to a third mouse button signal for enabling additional scrolling or other features in host software. A comparable switch could be mounted beneath the capacitive touch sensors of FIGS. 11 through 14, but other methods are preferred in order to avoid the cost and reliability problems inherent in switches.

Figure 15:
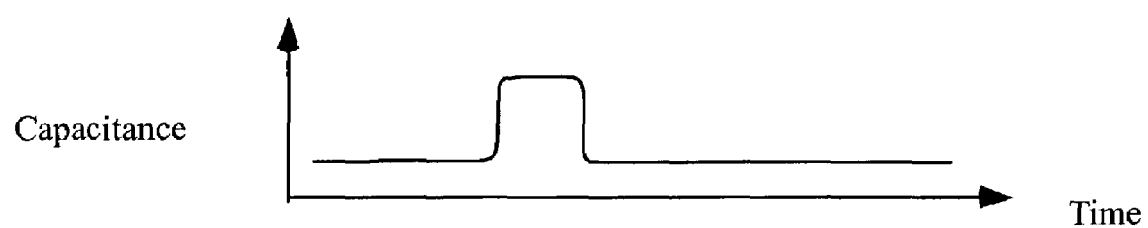
FIG. 15 is a graphical depiction showing total summed capacitance signal over time in employing the capacitive mouse of the present invention.
Figure 15:
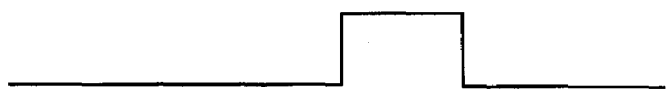

One way to simulate a third mouse button in a capacitive scrolling control is to decode tapping gestures using the various methods disclosed in U.S. Pat. No. 5,880,411. In the most simple case, basic finger taps are decoded and translated into simulated clicks of the third mouse button. FIG. 15 shows the total summed capacitance signal over time, and the corresponding third button signal resulting from tap detection. The '411 patent discloses many additional refinements for tap detection on capacitive touch sensors, many of which are suitable for application to scrolling controls.

A second way to simulate a third mouse button is to introduce an additional touch sensor plate which forms a capacitive button as disclosed in FIGS. 8A or 8B.

Arrayed capacitive touch sensors, particularly two-dimensional sensors like that of FIG. 14, can resolve numerous additional types of input that more specialized sensors like wheels and isometric joysticks cannot. One example is the use of multiple fingers to activate special modes or user interface commands; U.S. Pat. No. 5,880,441 discloses one embodiment of multi-finger sensing. Another example is graphic gestures, where looping motions and other finger motions that are not entirely horizontal or vertical can be interpreted as special user interface commands. Yet another example is special designated zones in which finger motion or tapping invokes special behaviors.

Because the capacitive scrolling control feels similar to a scrolling wheel to the user, other techniques may be employed to strengthen the wheel analogy. One such technique is "momentum" or "coasting," in which scrolling behavior is adjusted based on the velocity of finger motion as the finger lifts away from the scroll sensor.

Figure 16A:
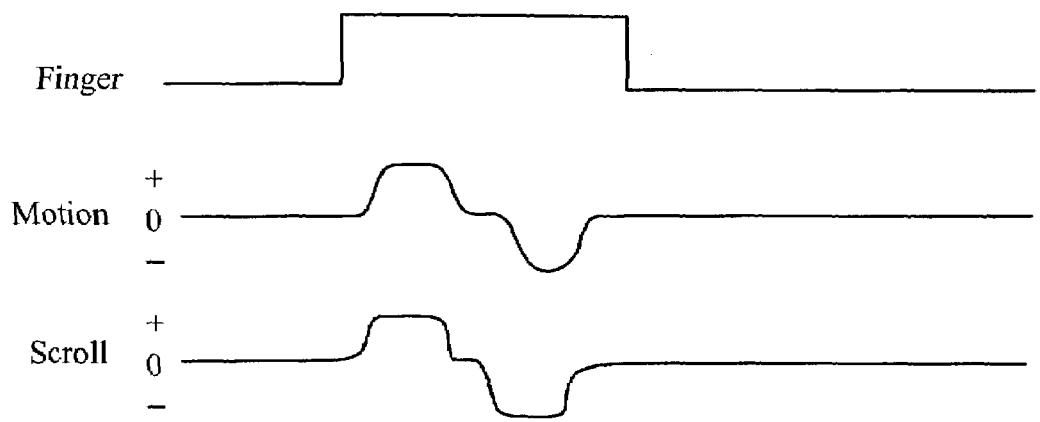
FIGS. 16A through 16C are graphical depictions of the coasting feature of the present invention.
Figure 16B:
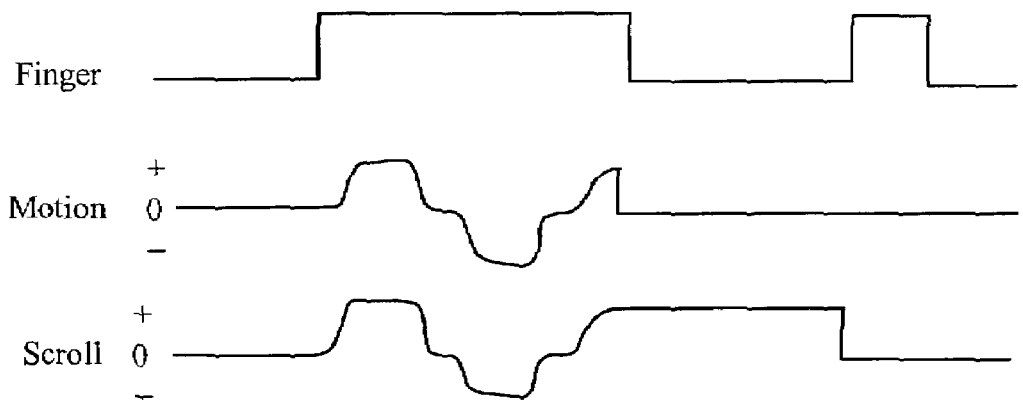

FIGS. 16A and 16B illustrate the basic coasting feature. Each figure shows the finger presence or absence, the computed finger motion, and the resulting scrolling signal generated by the mouse. For simplicity, motion and scrolling in only one dimension are considered as in the case of FIG. 11; the two-dimensional scrolling of FIG. 14 leads to a straightforward generalization of FIG. 16. Note that the finger motion is undefined when the finger is absent; in FIGS. 16A and 16B, the motion is plotted as zero when the finger is absent for purposes of illustration.

In FIG. 16A, the finger touches the scrolling sensor, moves back and forth to generate a corresponding back-and-forth scrolling signal, then comes to a complete stop before lifting. When the processor observes a zero or near-zero velocity as the finger lifts, it ceases all scrolling activity; coasting does not occur.

In FIG. 16B, the finger executes the same scrolling motions, but then moves again and lifts while still moving. When the processor observes that the velocity was substantially non-zero as the finger began lifting, the processor continues scrolling in a direction and speed determined by the final velocity of the finger upon lifting. The effect as seen by the user is that the imaginary scroll wheel is left spinning, or coasting, by the finger motion on it. In the preferred embodiment, the coasting speed and direction are equal to the scrolling speed and direction just before the finger lifted, though in alternate embodiments, the coasting speed could be constant or the coasting speed and direction could be some other function of the final scrolling speed and direction.

To terminate coasting, the user simply returns the finger to the scrolling control as seen in FIG. 16B. No special processing is needed to accomplish this aspect of coasting: As soon as the finger returns to the scrolling control, the coasting signal is replaced by fresh motion signals, which are zero until the finger actually moves on the control. The effect as seen by the user is that the imaginary spinning scroll wheel is halted as soon as the finger is pressed on it. Coasting is a valuable aid to long-distance scrolling through large documents.

Figure 16C:

FIG. 16C shows an additional optional aspect of coasting, wherein friction is simulated by having the coasting speed slowly decay to zero as the finger is held off the scroll sensor. FIG. 16C shows an alternate scrolling signal to that of FIG. 16B in which friction slows the coasting effect over time.

The user can still halt the coasting before it has come to a natural stop by touching the finger back to the scrolling control.

Some mice offer other features in addition to motion, two buttons, and scrolling. Many of these features are also well suited to a capacitive implementation. One example is additional buttons for special functions such as Internet browsing. Another example is additional scroll-like functions such as a separate "zoom" control. Still another example is a general hand proximity sensor on the mouse enclosure that allows the mouse and associated software to tell whether or not the user's hand is gripping the mouse. Those experienced in the art will recognize that the various types of capacitive sensors, buttons, rotary, linear and two-dimensional, are appropriate for a wide variety of applications beyond those specific examples disclosed here.

Referring back to FIG. 1, any combination of one or more of the motion sensors 106, button sensors 110, scrolling sensors 114, and any additional sensors can be implemented by capacitive methods as disclosed herein. In typical mice, the signals from all these types of sensors, whether capacitive, mechanical, optical or otherwise are combined in processor 116 to produce a mouse signal to be sent to the host computer. Standard protocols are well known in the art for sending motion, button, and scrolling signals from a mouse to a host computer. These same protocols may be used when one, several, or all of the sensors are implemented by capacitive techniques. Thus, the capacitive mouse of the present invention is fully interchangeable with conventional mice with no change to host mouse drivers or other system-level facilities.

It is possible and may be desirable to construct a mouse that uses a combination of capacitive, mechanical and other sensing techniques. For example, a capacitive scrolling sensor could be added to an otherwise conventional mechanical mouse. Or, a capacitive motion sensor could be used on a mouse with mechanical buttons and no scrolling control at all.

If several or all sensor functions of the mouse are implemented capacitively, it may be possible to use a single capacitive sensing chip for all capacitive sensing functions. Thus, for example, if capacitive sensing is used on the mouse for scrolling, then it may cost little more to implement the motion sensor capacitively as well using additional input channels of the same capacitance measuring chip.

Figure 2C:
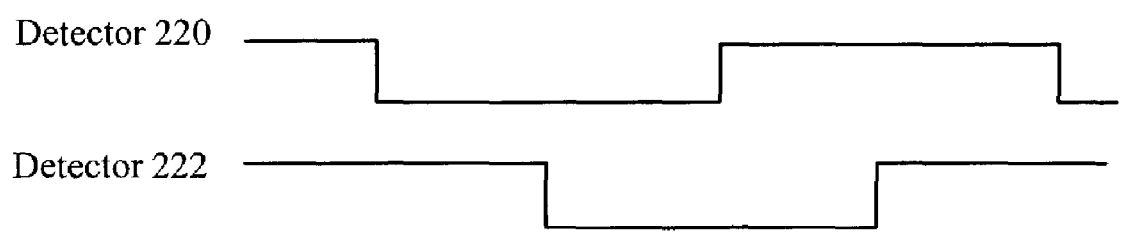
FIG. 2C is a digital quadrature waveform generated by the rotary disk of FIG. 2B.

It is possible to purchase mouse processor chips that perform all of the tasks of processor 116 or a conventional mouse. These chips generally accept motion and scrolling inputs in quadrature form as shown in FIGS. 2C and 2D, and the buttons are implemented as switches which alternately drive an input pin to a high or low voltage.

Figure 17:
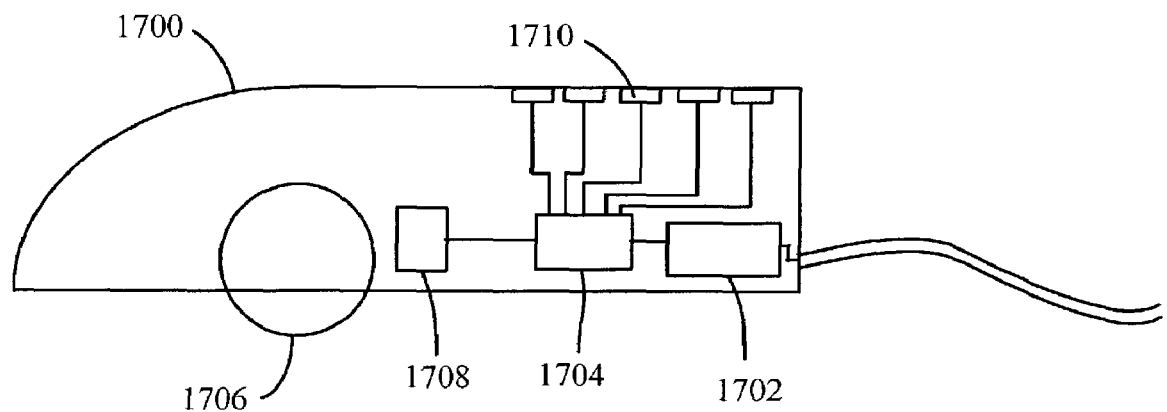
FIG. 17 is a side view of a mouse enclosure housing the capacitive features of the present invention.

FIG. 17 shows how a capacitive mouse 1700 can be built using a conventional mouse processor chip 1702 in conjunction with a capacitance measuring chip 1704. Ball 1706 drives capacitive motion sensor 1708, whose sensing plates connect to chip 1704. Scrolling sensors 1710 also connect to chip 1704, as do the button sensors (not shown). Chip 1704 computes motion and scrolling signals using the techniques disclosed herein, and then generates quadrature signals as outputs with timing and characteristics matching those produced by a true rotary sensor such as that of FIG. 2A. Chip 1702 then converts these artificial quadrature signals into standard mouse protocols. If quadrature is not appropriate, chips 1704 and 1702 could equally well use any other intermediate form for transmitting motion data. Chip 1704 also measures the signals from the capacitive mouse buttons, and drives its digital output pins high or low based on the observed button capacitances. Chip 1702 reads these digital button signals as if they came from mechanical switches. The arrangement of FIG. 17 is not as cost effective as a design with a single chip that does all the tasks, but it may greatly simplify the design of a new mouse using a new protocol or other features not yet supported by standard capacitive sensing chips.

Yet another alternative is to perform only rudimentary sensor processing on the mouse, producing an intermediate form such as the quadrature output by chip 1704 of FIG. 17. These signals can then be sent to a host computer for final processing, thus relieving some of the load from the low-cost mouse hardware. Another variation of this scheme is to send finger position data instead of fully processed scrolling motion data for a capacitive scroll sensor.

Figure 18:
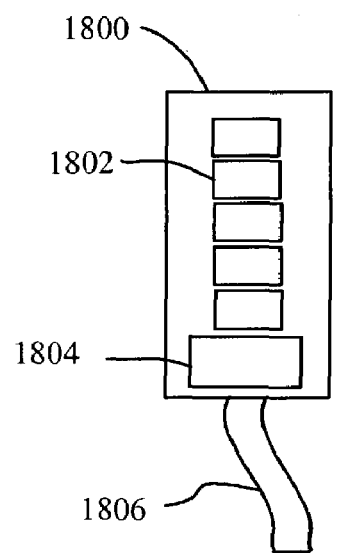
FIG. 18 is a schematic view of a scrolling module for use as a component of the present capacitive mouse.

FIG. 18 shows a scrolling module designed to be used as a component in a mouse design. Circuit board 1800 includes an array of sensors 1802 as well as a capacitive sensing chip 1804. Connector 1806 sends out quadrature signals compatible with conventional rotary encoders. Similarly, a self-contained rotary encoder module could be constructed using capacitive sensors. Using these modules, an industrial designer could construct the mouse of FIG. 17 using only standard components, without requiring any expertise in capacitive sensing.

As any person skilled in the art will recognize from the previous description and from the figures and claims, modifications and changes can be made to the preferred embodiments of the invention without departing from the scope of the invention defined in the following claims.

We claim:

1. A pointing device comprising:
 a computer mouse configured to generate cursor commands;
 a touch sensor coupled to said computer mouse, said touch sensor configured for measuring motion of a finger along an axis, said touch sensor configured for operating by capacitive means; and
 a processor in operative communication with said touch sensor, said processor configured to generate a scrolling command in response to said motion of said finger along said axis, said processor is configured to cease said scrolling command after finger lifting from said touch sensor without substantially continuing generating said scrolling command responsive to said responsive to said finger being stationary prior to lifting from said finger lifting, said processor further configured to continue generating said scrolling command responsive to said finger lifting from said touch sensor for a time after said finger lifting to emulate coasting responsive to said finger motion prior to said finger lifting.

2. The pointing device of claim 1 further comprising:
 a friction simulation means configured to decay scrolling action of said scrolling command in response to cessation of said scrolling command after said finger lifts from said touch sensor.

3. A touch sensor system, comprising:
 a one-axis touch sensor configured for sensing an object along a single axis; and
 a processor in operative communication with said one-axis touch sensor, said processor configured to generate a scrolling signal responsive to sensing motion of said object along said one-axis touch sensor, and wherein said processor is further configured to cease said scrolling, without substantially continuing said scrolling signal, responsive to said object being substantially stationary prior to said object lifting from said one-axis touch sensor, wherein said processor is further configured to continue said scrolling signal for a time after lifting off of said object from said one-axis touch sensor to emulate coasting responsive to sensing object motion prior to said lifting off of said object from said one-axis touch sensor.

4. The one-axis touch sensor of claim 3 wherein said scrolling signal is compatible with that from a standard commercial scroll wheel mouse.

5. The one-axis touch sensor of claim 3 wherein said processor is configured to measure the amount of motion of said object occurring prior to the lifting off of said object from said one-axis touch sensor, and wherein the one-axis touch sensor configured to continue said scrolling signal when said amount of motion exceeds a predetermined threshold.

6. The one-axis touch sensor of claim 5 wherein said predetermined threshold is non-zero.

7. A one-axis touch sensor comprising:
 a sensor configured to sense a finger along a single axis of the one-axis touch sensor; and a processor in operative communication with said sensor, wherein said sensor is configured to transmit to said processor one of a touch signal responsive to motion of said finger touching said sensor, and a lift signal responsive to lift off of said finger from said sensor, and wherein said processor is configured to generate a scrolling signal responsive to said touch signal and said lift signal and wherein said processor is further configured to generate a coasting signal for a time after said lift off of said sensor to emulate coasting responsive to finger motion prior to said lift off of said finger.

8. The one-axis touch sensor of claim 7 wherein said touch signal includes an indication of a presence of said finger touching said sensor and a motion of the finger along said axis.

9. The one-axis touch sensor of claim 8 wherein said scrolling signal is an indication of said non-zero velocity.

10. The one-axis touch sensor of claim 7 wherein both said lift signal and said touch signal are responsive to a continuous action comprising a contact of said finger on said sensor, said motion of said finger along said axis and said lift off of said finger.

11. The one-axis touch sensor of claim 7 wherein said coasting signal indicates said motion of said finger along said axis being a non-zero velocity during said lift off.

12. The one-axis touch sensor of claim 7 wherein said scrolling signal is in quadrature form, said quadrature form including characteristics of being the type of signals produced by a rotary encoder.

13. A touch sensor system comprising:
a capacitive sensor configured to sense a finger along an axis; and
a processor in operative communication with said capacitive sensor, said processor configured to generate scrolling in response to motion of said finger along said axis, wherein said processor is configured to cease said scrolling, without substantially continuing said scrolling, responsive to said finger being substantially stationary prior to said finger lifting from said capacitive sensor, and wherein said processor is further configured to continue generating scrolling for a time after a finger lift from said capacitive sensor to emulate coasting when said finger lift was preceded by finger motion along the axis.

14. The touch sensor system of claim 13 wherein said processor is further configured to decay scrolling after said finger lift when said finger lift was immediately preceded by finger motion along the axis.

* * * * *

UNITED STATES PATENT AND TRADEMARK OFFICE
CERTIFICATE OF CORRECTION

PATENT NO. : 7,212,189 B2
APPLICATION NO. : 10/382799
DATED : May 1, 2007
INVENTOR(S) : Shaw et al.

It is certified that error appears in the above-identified patent and that said Letters Patent is hereby corrected as shown below:

In Column 16, lines 23-24, delete "generating", and add --to generate--;
In Column 16, lines 24-25, delete "to said responsive";
In Column 16, line 25, following "finger being" add --substantially--;
In Column 16, line 25, delete "lifting from";
In Column 16, line 47, following "touch sensor," add --and--;
In Column 16, line 60, following "touch sensor," add --is--; and
In Column17, line 10, following "lift off of said" add --finger from said--.

Signed and Sealed this

Nineteenth Day of June, 2007

JON W. DUDAS
*Director of the United States Patent and Trademark Office*